(12) United States Patent
Martini (10) Patent No.: US 11,799,960 B2
(45) Date of Patent: Oct. 24, 2023

(54) DISTRIBUTED NETWORK SECURITY SYSTEM PROVIDING ISOLATION OF CUSTOMER DATA

(71) Applicant: iboss, Inc., Boston, MA (US)

(72) Inventor: Paul Michael Martini, Boston, MA (US)

(73) Assignee: iboss, Inc., San Diego, CA (US)

( * ) Notice: Subject to any disclaimer, the term of this patent is extended or adjusted under 35 U.S.C. 154(b) by 127 days.

(21) Appl. No.: 17/189,082

(22) Filed: Mar. 1, 2021

(65) Prior Publication Data

US 2021/0258381 A1 Aug. 19, 2021

Related U.S. Application Data

(63) Continuation of application No. 16/666,296, filed on Oct. 28, 2019, now Pat. No. 10,938,906, which is a (Continued)

(51) Int. Cl.
*G06F 15/16* (2006.01)
*H04L 67/1097* (2022.01)
(Continued)

(52) U.S. Cl.
CPC ...... *H04L 67/1097* (2013.01); *G06F 9/45533* (2013.01); *G06F 9/45558* (2013.01);
(Continued)

(58) Field of Classification Search
CPC ......... G06F 9/45533; G06F 2009/4557; G06F 2009/45595; G06F 9/45558; G06F 2009/45579; G06F 2009/45587; H04L 12/4641; H04L 63/20; H04L 67/10; H04L 67/1097; H04L 63/0209; H04L 67/52
See application file for complete search history.

(56) References Cited

U.S. PATENT DOCUMENTS 8,307,362 B1 11/2012 Gong
9,069,607 B1 6/2015 Gopalakrishna Alevoor
(Continued)

OTHER PUBLICATIONS

Amazon Web Services, Inc., "Amazon Elastics Compute Cloud User Guide for Linux Instances", Apr. 2016, 845 pages.
(Continued)

*Primary Examiner* — John B Walsh
(74) *Attorney, Agent, or Firm* — Fish & Richardson P.C.

(57) ABSTRACT

Techniques for delivering a distributed network security service providing isolation of customer data are described. One example method includes assigning a first node in a distributed network to a first customer; assigning a second node in the distributed network to a second customer; configuring the assigned first node to process network traffic only from the first customer; configuring the assigned second node to process network traffic only from the second customer; processing, by the assigned first node, network traffic associated with the first customer; and processing, by the assigned second node, network traffic associated with the second customer, wherein the network traffic of the first customer is isolated from the network traffic of the second customer, wherein the network traffic of the customers is kept isolated from one another.

20 Claims, 7 Drawing Sheets

Related U.S. Application Data continuation of application No. 15/233,894, filed on Aug. 10, 2016, now Pat. No. 10,462,219.

(51) Int. Cl.
*H04L 9/40* (2022.01)
*G06F 9/455* (2018.01)
*H04L 67/10* (2022.01)
*H04L 12/46* (2006.01)
*H04L 67/52* (2022.01)

(52) U.S. Cl.
CPC ...... *H04L 12/4641* (2013.01); *H04L 63/0209* (2013.01); *H04L 63/20* (2013.01); *H04L 67/10* (2013.01); *H04L 67/52* (2022.05); *G06F 2009/4557* (2013.01); *G06F 2009/45579* (2013.01); *G06F 2009/45587* (2013.01); *G06F 2009/45595* (2013.01)

(56) References Cited

U.S. PATENT DOCUMENTS

| | | |
|---|---|---|
| 9,456,011 B1 | 9/2016 | Nick |
| 10,404,702 B1 | 9/2019 | Chakraborty |
| 2009/0238078 A1 | 9/2009 | Robinson |
| 2013/0198354 A1 | 8/2013 | Jones |
| 2015/0052525 A1 | 2/2015 | Raghu |
| 2015/0139238 A1 | 5/2015 | Pourzandi |
| 2015/0358399 A1 | 12/2015 | Baugher |
| 2015/0381568 A1 | 12/2015 | Johnson et al. |
| 2016/0088092 A1 | 3/2016 | Cardona-Gonzalez |
| 2017/0111446 A1 | 4/2017 | Rivera |
| 2018/0123928 A1* | 5/2018 | Moradi ............... H04L 43/0852 |

OTHER PUBLICATIONS

Canosa, Examiner in corresponding European application No. EP 17 84 0304, EESR dated May 20, 2019, 10 pages.

Openstack.org, "OpenStack Docs: Data Privacy Concerns", Aug. 5, 2016, downloaded from the internet at http://docs.openstack.org/security-guide/tenant-data/data-privacy-concerns.html, on August. 8, 2016, 7 pages.

Sorrella, "Securing the Cloud: Separation and Isolation is Key", Dec. 23, 2010, downloaded from the internet at: http://www.securityweek.com/securing-clond-separation-and-isolation-key on Aug. 8, 2016, 9 pages.

* cited by examiner

DISTRIBUTED NETWORK SECURITY SYSTEM PROVIDING ISOLATION OF CUSTOMER DATA

CROSS-REFERENCE TO RELATED APPLICATIONS

This application is a continuation application of and claims priority to U.S. application Ser. No. 16/666,296 filed on Oct. 28, 2019, which is a continuation application of and claims priority to U.S. application Ser. No. 15/233,894 filed on Aug. 10, 2016 (now U.S. Pat. No. 10,462,219).

BACKGROUND

A computer network is a collection of computers and other hardware interconnected by communication channels that allow sharing of resources and information. Communication protocols define the rules and data formats for exchanging information in a computer network.

Distributed computing involves multiple computing devices organized to cooperatively perform a particular application. For example, a computationally expensive task may be split into subtasks to be performed in parallel by the computing devices in the distributed network, allowing the task to be completed faster. Distributing computing may also involve fragmenting a data set and storing it across multiple storage devices. Distributed computing may also involve the multiple computing devices handling individual requests from clients, such as requests for data received over the Internet. Providing computing services over the Internet using such a distributed approach is generally referred to as "cloud computing."

SUMMARY

Techniques for delivering a distributed network security service providing isolation of customer data are described. One example method includes assigning a first node in a distributed network to a first customer; assigning a second node in the distributed network to a second customer; configuring the assigned first node to process network traffic only from the first customer; configuring the assigned second node to process network traffic only from the second customer; processing, by the assigned first node, network traffic associated with the first customer; and processing, by the assigned second node, network traffic associated with the second customer, wherein the network traffic of the first customer is isolated from the network traffic of the second customer, wherein the network traffic of the customers is kept isolated from one another.

Other features, aspects and potential advantages will be apparent from the accompanying description and figures.

DESCRIPTION OF DRAWINGS

Like reference symbols in the various drawings indicate like elements.

DETAILED DESCRIPTION

Most organizations today are distributed. Such an organization may include mobile users, remote sites, branch offices, home offices, cloud-hosted assets and spread across multiple networks and multiple physical locations. This presents challenges in applying traditional cybersecurity techniques to such distributed assets, as such techniques may require implementation at each location within the organization, and the organization may not control the networks utilized by some assets (e.g., mobile users).

One possible approach to providing such cybersecurity involves using traditional cybersecurity appliances hosted in a central location controlled by the organization. In such a configuration, network traffic may need to be backhauled from the organization's assets to the central location, which can be costly. Further, the organization itself may have to implement and manage the traditional cybersecurity appliance, which can lead to additional expense.

Another approach involves hosting appliances onsite to secure users and assets within the organization's perimeter and then using a cloud-based service to secure mobile users and remote assets. Although this approach can eliminate data backhaul to the cybersecurity appliances hosted onsite, the organization will have to manage both its internal cybersecurity appliances as well as the cloud-based service. This may be inefficient since the two systems will likely have two separate administration interfaces. The configurations of the two systems may also have to be synchronized manually, leading to additional expense and the possibility of inconsistent security policies being applied.

Another possible approach is an entirely cloud-based cybersecurity system. However, such a system may present problems in terms of data security and fulfilling organizational requirements. For example, there are regional and country-based requirements, such as Safe Harbor, that require data to stay within a particular location. Cloud-based services generally do not enforce such requirements, as the computing devices that scan and store the organization's data may be scattered across different locations within the cloud network. In addition, cloud networks generally utilize a multi-tenant model, which customer data processing and storage is generally on shared resources, and not isolated from the data of other customers of the cloud network. Because of this, security becomes a major concern. A single, compromised cloud system can expose data from multiple, unrelated customers.

Performance may also be a concern in such a cloud system. Since resources are shared between customers, it may be difficult to guarantee performance as rapid changes in demand from one customer can affect other customers that happen to be using the same computing devices within the cloud network.

Accordingly, the present disclosure describes an approach to providing cybersecurity to a customer (e.g., an organization) that provides the benefits of a cloud-based system, while ensuring that the customer's data is isolated from the data of other customers in the system. The approach also allows for cybersecurity appliances (e.g., nodes) installed at a customer site to be utilized, and integrates such on-premise appliances into the cloud network. One example method for providing such a system includes assigning a first node in a distributed network to a first customer. The first node is selected from a set of unassigned nodes that are not assigned to any customer. A second node in the distributed network is assigned to a second customer. The second node is also selected from the set of unassigned nodes. Both nodes are configured to only process network traffic associated with the assigned customer. When network traffic is processed by the nodes, network traffic from the first customer is isolated from network traffic from the second customer, and vice versa.

This approach may lead to several advantages. For example, the present techniques may allow an organization to leverage as much or as little of the cloud for network-based cybersecurity as desired, depending on organizational needs. This includes hosting all nodes on-site, using all cloud-based nodes, which require no hosted hardware, or mixing both to form a secure hybrid strategy. The present techniques may ensure that the same level of network cybersecurity is provided regardless of whether a user or asset is within the organization's perimeter or remote. Because both on-premise and cloud nodes are integrated into the system, a single consolidated view of reporting data and logs may be provided for the entire organization, including local and remote users and assets. Further, by providing operating system-level isolation between customers, the system may alleviate security and privacy issues generally associated with cloud-based systems. The system may also provide on-demand scalability, with the ability to assign additional nodes to a customer in response to increased network traffic.

The present approach may also offer the ability to leverage globally available cloud infrastructure to service mobile users as they travel abroad, and may improve speed and performance by servicing remote users using a cloud node that is geographically nearby. In addition, the system may provide a configurable upgrade policy that allows even globally distributed organizations to control when upgrades occur in the cloud, including configuring on-demand upgrades and different upgrade schedules, depending on geographic location.

Figure 1:
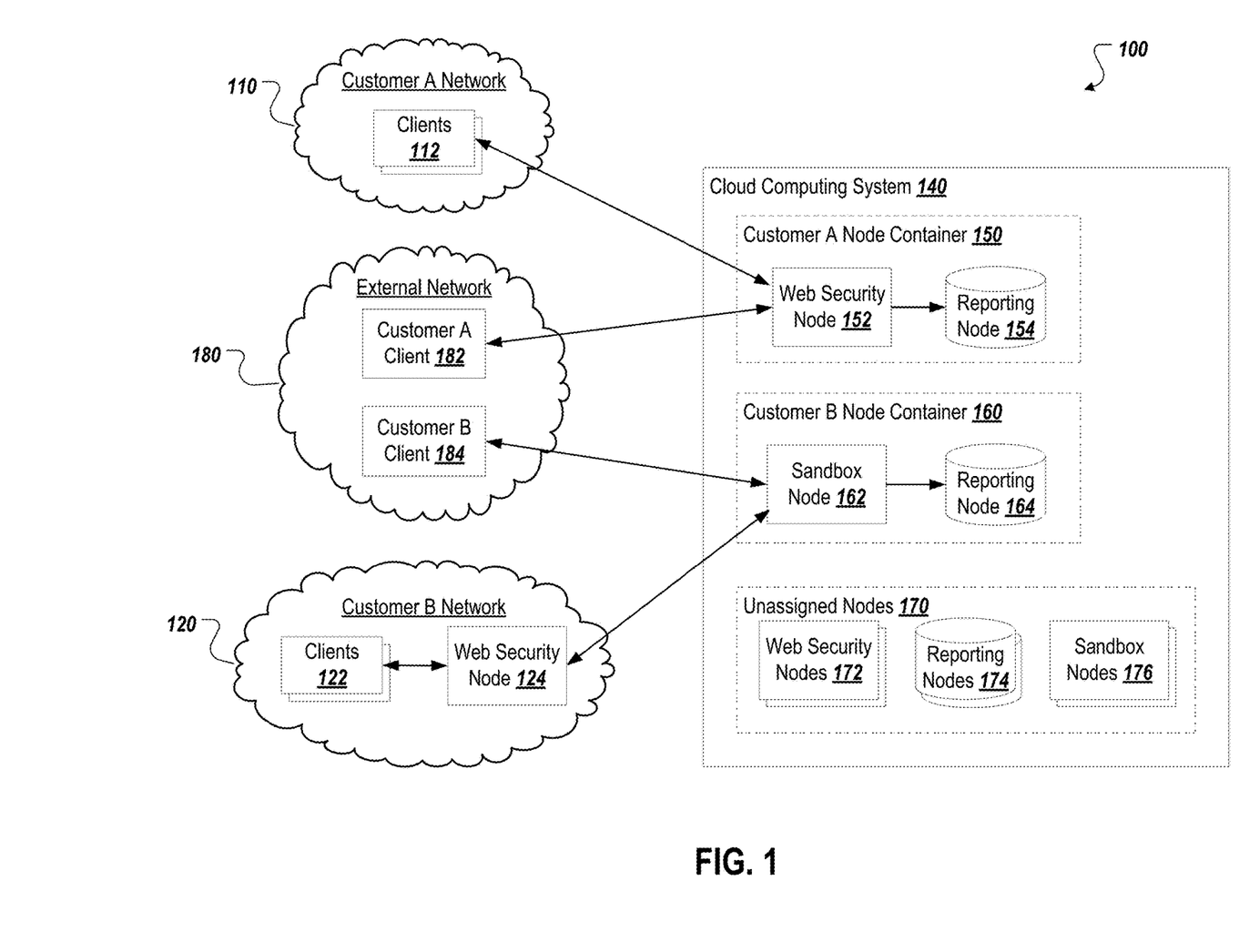
FIG. 1 is a block diagram of an example computer system for delivering a distributed network security service providing isolation of customer data.

FIG. 1 is a block diagram of an example computer system 100 for delivering a distributed network security service providing isolation of customer data. As shown, the system 100 includes a network 110 controlled by first customer (customer A) and a network 120 controlled by a second, different customer (customer B). Networks 110 and 120 are in communication with cloud computing system 140. The cloud computing system 140 includes a customer A node container 150 including nodes 152, 154, a customer B node container 160 including nodes 162, 164, and a set of unassigned nodes 170 including nodes 172, 174, 176. In operation, network traffic from clients 112 on the customer A network 110 is processed by the nodes 152, 154 in the customer A node container 150. Network traffic from the clients 122 on the customer B network 120 is processed first by the on-premise node 124, and then by the nodes 162, 164 in the customer B node container 160. As shown, each of the node container 150, 160 exclusively processes network traffic and stores data associated with its assigned customer (i.e., customer A for node container 150, customer B for node container 160). In this way, network traffic and data associated with customer A is isolated from network traffic associated with customer B, and vice versa. The cloud computing system 140 may also assign nodes from the set of unassigned nodes 170 to either customer A or customer B automatically, such as in response to increased network traffic, node failures, changes to configuration requirements made by the customer, or other events. The cloud computing system 140 may also receive network traffic from clients on an external network 180 separate from the customer A network 110 and the customer B network 120. As shown, network traffic from clients 182 associated with customer A may be processed by nodes within customer A node container 150, and network traffic from clients 184 associated with customer B may be processed by nodes within the customer B node container 160.

The cloud computing system 140 may be a distributed system including a plurality of computing devices or "nodes" interconnected by one or more communications networks. In some cases, the cloud computing system 140 may be a system configured to provide cybersecurity services to customers (e.g., customer A, customer B) by processing, storing, analyzing, and/or filtering network traffic provided to it by the customers. For example, customer A may configure network 110 such that network traffic generated by clients 112 is routed through the cloud computing system 140, such as by configuring the clients 112 to use cloud computing system 140 as a proxy server or gateway when accessing external networks such as the Internet. The clients 112 may then send requests for resources on the Internet to cloud computing system 140, where the requests may be processed by nodes 152, 154 assigned by the cloud computing system 140 to customer A. The operation of these nodes is described in more detail below. In some cases, the network traffic sent from the clients 112 to the cloud computing system 140 may be encrypted, such as, for example, using Hypertext Transfer Protocol Secure (HTTPS), Internet Protocol Security (IPSec) tunnels or other Virtual Private Network (VPN) techniques, Layer 2 Medium Access Control (MAC) Address redirection, Generic Routing Encapsulation (GRE), Web Cache Communication Protocol (WCCP), or other techniques. In some cases, the clients 112 may include a software agent executing locally to forward the network traffic to the cloud computing system 140. The cloud computing system 140 may also receive a copy or mirror of the network traffic from the clients 112 for processing.

The nodes of the cloud computing system 140 may analyze the network traffic received from the customers, and forward the traffic onto the intended destination, such as a website or other resource on the Internet. The network traffic received from the clients 112 may include traffic using different communications protocols, such as, for example, Hypertext Transfer Protocol (HTTP), Domain Name System (DNS) protocol, File Transfer Protocol (FTP), or other protocols. In some cases, the cloud computing system 140 may also receive and process network traffic sent from resources on the external network to the clients 112, such as webpages, files, or other data sent from servers on the Internet in response to requests by the clients 112.

The cloud computing system 140 may also receive customer network traffic from on-premise nodes (e.g. 124) located within the customer's network. For example, the web security node 124 may receive and process network traffic from the clients 122 at a location inside the customer B network 120. After processing the traffic, the web security node 124 may send the network traffic to the cloud computing system 140 for additional processing. The web security node 124 may be configured to communicate with the cloud computing system 140 using the same techniques described above relative to the clients 112.

In some cases, the cloud computing system 140 may be a globally or regionally distributed network, with the nodes and other components of the system located across different geographic areas and connected by high-speed communications networks, such as, for example, optical networks, wireless networks, satellite networks, or other types of networks. In some cases, the components may be connected at least partially over the Internet. The networks connecting the components may utilize different protocols or technologies at different layers in the Open Systems Interconnection (OSI) model, including transport layer technologies such as Ethernet, Asynchronous Transfer Mode (ATM), or Synchronous Optical Networking (SONET), and network layer technologies such as Internet Protocol (IP), Transmission Control Protocol (TCP), or Universal Datagram Protocol (UDP). The components of the cloud computing system 140 may communicate over these networks using application layer communications protocols, such as, for example, HTTP, FTP, Simple Object Access Protocol (SOAP), Remote Procedure Call (RPC), or using other proprietary or public protocols for application programming interfaces That (APIs). The cloud computing system 140 may also include controller components (not shown) to coordinate the operations of the nodes. The controller components may execute on separate computing devices from the nodes and/or may be resident on the nodes themselves.

Customer A network 110 and customer B network 120 include clients 112 and clients 122 respectively. The clients 112, 122 may be computing devices such as PCs, laptops, tablets, telephones, servers, routers, storage devices or other network enabled computing devices. The networks 110, 120 may be networks operated by the associated customer, such as a wireless or wired network within a particular building or buildings or campuses. In some cases, the networks 110, 120 may be virtual networks, such as a VPN. The networks 110, 120 may utilize one or more communications technologies including but not limited to Ethernet, Wi-Fi (e.g., IEEE 802.11x), WiMAX (IEEE 802.16), Long Term Evolution (LTE), or other technologies. The clients 112, 122 may be computing devices owned or controlled by customer A and customer B, respectively, and may be used by employees of the customers. In some cases, the clients 112, 122 may not be owned or controlled by the customers, such as in the case the network 110, 120 is a bring your own device (BYOD) network, or an access network such as an Internet service provider (ISP) network.

External network 180 is a network separate from customer A network 110 and customer B network 120. In some cases, external network 180 may be a public network such as the Internet. The external network 180 may also be a network owned or controlled by an organization besides customer A or customer B, such as a corporate network, an ISP access network, a cellular provider network, or other network. As shown in FIG. 1, the clients 182, 184 configured to send network traffic to the cloud computing system 140. Accordingly, the network traffic from these external clients 182, 184 may be processed in the same way as traffic originating from the customer networks 110, 120, and the same benefits, such as the traffic and data isolation described above, may be realized.

The cloud computing system 140 includes nodes 152, 154, 162, 164, 172, 174, 176. As described above, nodes are resources within the cloud computing system 140 configured to process network traffic received from clients. The cloud computing system 140 may include different types of nodes, such as, for example, web security nodes 152, 172, reporting nodes 154, 164, 174, and sandbox nodes 162, 176. The different types of nodes within the cloud computing system 140 may be configured to perform different functions.

For example, web security nodes 152, 172 may be configured to analyze received network traffic and apply network policies to the traffic, such as by selectively blocking, allowing, filtering, or performing other actions on the traffic based on the configuration attribute set by the particular customer to which the particular node is assigned. For example, web security nodes 152, 172 may filter requests for content from the clients 112, 122, and/or content sent from external resources to the clients 112, 122. Content matching certain parameters specified by the customer may be filtered, such as, for example, requests to certain domain names or Universal Resource Locators (URLs), requests for or responses including specific file types, traffic formatted according to certain protocols, traffic from certain users or clients, or other parameters. The web security nodes 152, 172 may also identify and log (e.g., store with a reporting node) particular network events, including actual or suspected malware intrusions, actual or suspected network breaches, visits by clients to malicious, unsafe, or inappropriate websites, downloads of malicious, unapproved, or unlicensed software by clients, or other events. The web security nodes 152, 172 may also identify and store behavioral data, such as client or user network activity, network flows, or other data. In some cases, the web security nodes 152, 172 may be configured to provide proxy service to clients of an assigned customer by forwarding requests received from the clients to appropriate external resources, and forwarding responses from the resources back to the clients. Such forwarding may be selective based on the filtering functionality discussed above.

Reporting nodes 154, 164, 174 may be configured to store network traffic and/or results of analysis by other nodes, and to produce reports based on the stored data for presentation to users or administrators of the cloud computing system 140. The reports may include, but are not limited to, drill down reports allowing network activity to be viewed at both specific and high levels, event logs showing network traffic or other events matching particular criteria, real-time dashboards providing views of the current state of a customer's network traffic, incident response dashboards for monitoring issues with the customers network traffic, and other reports.

Sandbox nodes 162, 176 may be configured to execute malicious or potentially malicious software programs in a virtual environment to allow the behavior of the programs to be analyzed without adverse effects to other computing devices external to the sandbox. In some cases, the malicious software programs may be identified by a web security node 152, 172, such as in a response from an external resource to request from a client. In addition to blocking the download of the malicious software program, the web security node 152, 172 may provide the identified malicious software program to sandbox node 162, 176 for execution and analysis.

The cloud computing system 140 may include other types of nodes not shown in the example configuration of FIG. 1. A risk assessment node may calculate a risk score for identified security events (e.g., intrusions, data exfiltration, denial of service attacks, or other events) in order to allow prioritization of the events based on a level of risk, which may facilitate planning of a remedy or response by the effected organization. For example, the risk assessment node may assign a higher risk score to a data exfiltration involving malicious removal of sensitive data from customer A network 110, and assign a lower risk score to an intrusion on the customer A network 110 that did not access any sensitive data. Such a risk score may be generated based on network traffic received from the clients 112, or based on data generated or stored by other nodes in the cloud computing system 140.

A log indexer node may organize data stored by a reporting node in a specific way to allow it to be accessed quickly, such as by another node within the cloud computing system 140, or by a user or administrator of the cloud computing system 140 through a user interface.

The set of unassigned nodes 170 includes nodes 172, 174, 176 that have not been assigned to a particular customer of cloud computing system 140. In order to provide more computing resources for particular customer, the cloud computing system 140 may select a node from the set of unassigned nodes 170, and assign the selected node to a particular customer, thus making it a part of the node container for the particular customer. In addition, if the cloud computing system 140 determines that the particular customer no longer needs the additional computing resources provided by the selected node (e.g., because network demand has decreased), the cloud computing system 140 may de-assign the selected node from the particular customer and return it to the set of unassigned nodes 170. In such a case, all customer data may be deleted from the node when it is de-assigned.

Nodes in the set of unassigned nodes 170 may be of particular node types, such as web security nodes 172, reporting nodes 174, and sandbox nodes 176. These nodes may be configured to perform the functions of their particular node type, but may be "blank" in the sense that they do not include configuration data for any particular customer. The cloud computing system 140 may select a node of a particular type of the particular customer needs more resources of that type. For example, if the cloud computing system 140 determines that the amount of network traffic from customer A has increased to a level where two web security nodes are required to deliver or maintain a particular level of performance or latency, the cloud computing system 140 may select a web security node 172 from the set of unassigned nodes 170, and assign it to customer A. Similarly, if the cloud computing system 140 determines that additional data storage capacity is needed for customer A, the cloud computing system 140 may select reporting node 174 from the set of unassigned nodes 170 and assign it to customer A.

As previously discussed, the nodes of the cloud computing system 140 may be physical computing devices (physical nodes) or virtual machine instances within virtual machine environments executed by physical computing devices (virtual nodes). The cloud computing system 140 may include both physical nodes and virtual nodes. In some cases, nodes in the same node container may be virtual nodes on the same computing device or physical nodes in the same chassis or data center to enable low latency communication between the nodes. For example, web security node 152 and reporting node 154 included in the customer A node container 150 may be virtual machine instances executed by the same physical computing device, thereby enabling the nodes to communicate without involving a network. Web security node 152 and reporting node 154 included in the customer A node container 150 may also be cards or blades connected to a data bus and contained within the housing or chassis, enabling the nodes to communicate over the data bus. Web security node 152 and reporting node 154 included in the customer A node container 150 may also be computing devices within a data center, enabling the nodes to communicate over a high speed local network implemented in the data center. In some cases, the web security node 152 and reporting node 154 may be physical or virtual nodes associated with computing devices in different geographic areas, and may communicate over a network. The web security node 152 and reporting node 154 may also be physical or virtual nodes associated with computing devices located on the customer A network 110, similar to the configuration shown for web security node 124 on the customer B network 120. The above configurations of the nodes in the cloud computing system 140 are merely exemplary, and other configurations are contemplated by the present disclosure.

In some implementations, each node in the cloud computing system 140 may be or be executed by a self-contained computing device including all resources it needs to perform its processing tasks. For example, the node may include one or more processors, one or more storage devices, and other computing components, and such components may be utilized only by the node itself (or other nodes executing on the same physical computing device in the case of virtual nodes). Because sharing of such physical computing components is limited, each node or set of virtual nodes may be self-contained, enabling data associated with the customer assigned to the node or set of virtual nodes to be effectively isolated.

Figure 2:
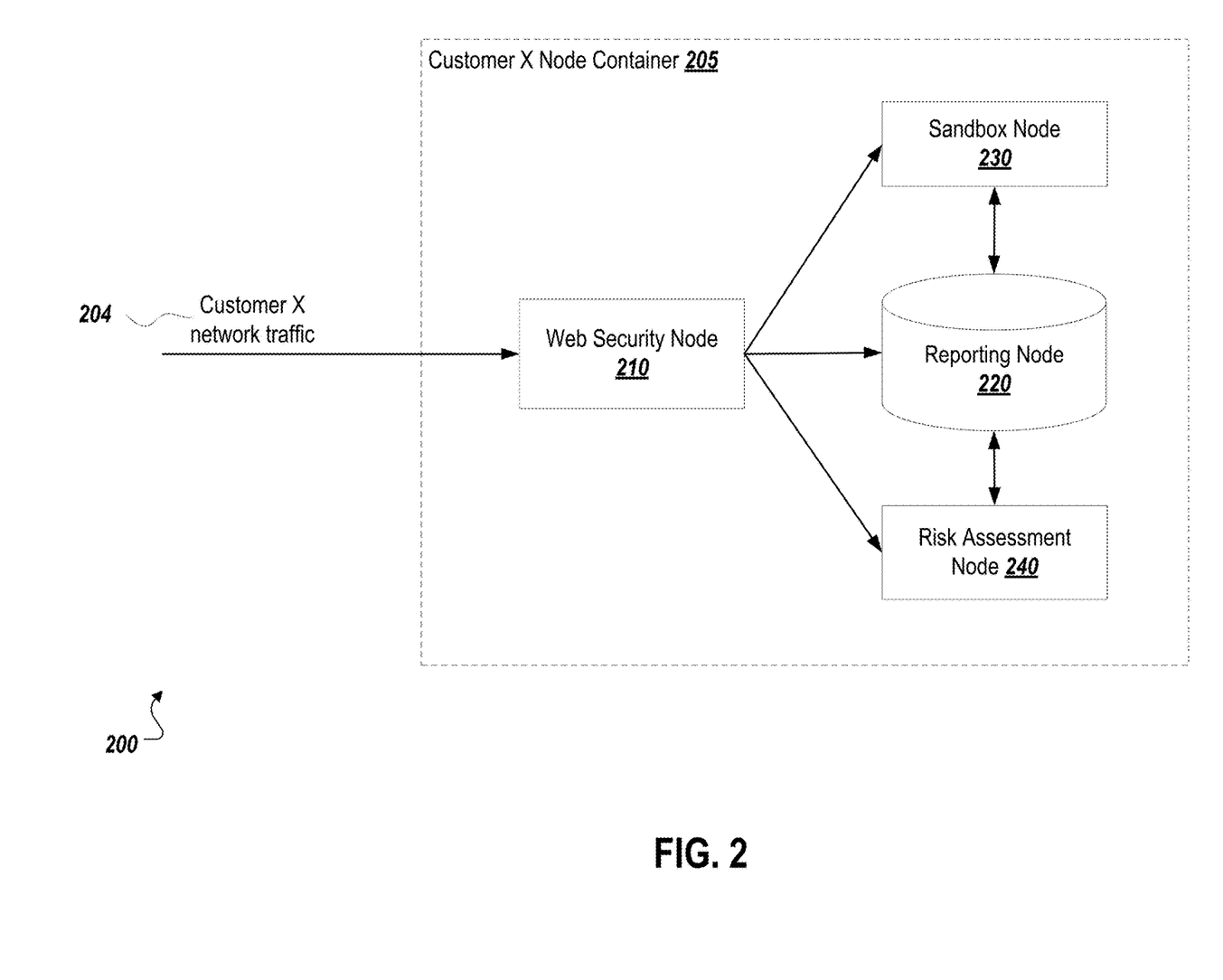
FIG. 2 is a block diagram of an example configuration of nodes assigned to a particular customer.

FIG. 2 is a block diagram of an example configuration 200 of nodes assigned to a particular customer X. As shown, the customer X node container 205 includes a web security node 210, a reporting node 220, a sandbox node 230, and a risk assessment node 240. The components may be configured according to any of the techniques described above relative to FIG. 1. As shown, the web security node 210 receives network traffic 204 associated with customer X. The web security node 210 processes the network traffic as described relative to FIG. 1.

The web security node 210 provides data based on the received network traffic 204 to the reporting node 220, the sandbox node 230, and the risk assessment node 240. In some cases, the web security node 210 may provide data generated based on the customer network traffic 204 and/or the customer network traffic 204 itself. In some cases, the web security node 210 may provide different data to different nodes based on the node type of the receiving node. The nodes 220, 230, 240 perform different processing actions on the data received from the web security node 210 based on their particular node type. Examples of these processing actions are described above the description of FIG. 1.

Figure 3:
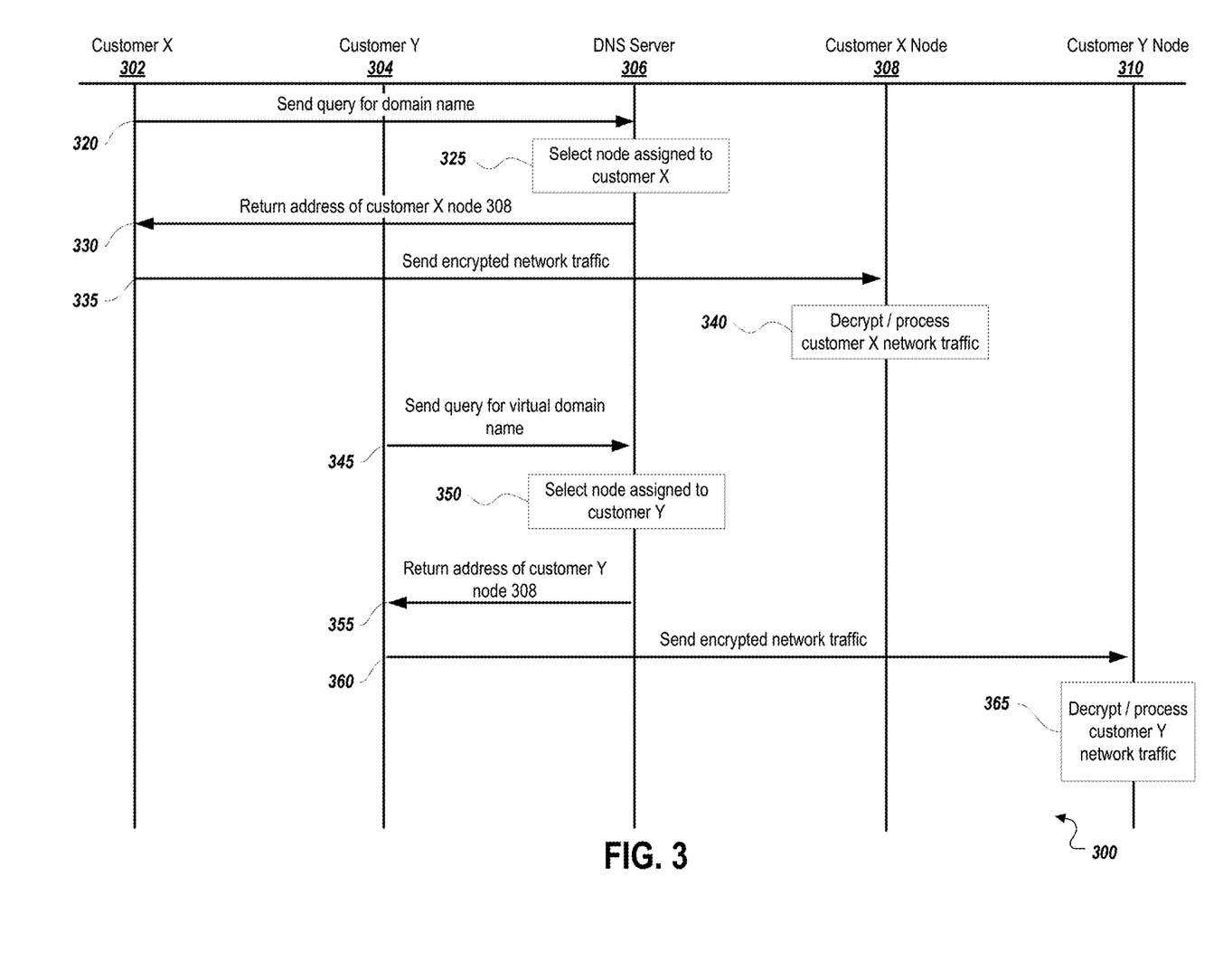
FIG. 3 is a swim lane diagram showing a process for delivering a distributed network security service providing isolation of customer data.

FIG. 3 is a swim lane diagram showing a process 300 for delivering a distributed network security service providing isolation of customer data. The process involves interaction between a customer X 302, a customer Y 304, a DNS server 306, and nodes 308, 310 assigned to customer X and customer Y, respectively. The nodes 308, 310 are included in a cloud computing system, such as that described relative to FIG. 1. The DNS server 306 may also be included in or be separate from the cloud computing system.

At 320, customer X 302 sends a DNS query including a domain name. In some cases, the domain name may be a "virtual" domain name, meaning that domain name does not refer to a specific server, but instead to any node or server hosting a node that can serve as an entry point into the customer's particular node container. For example, a virtual domain name sent by customer X might include a subdomain identifying the customer (e.g., "customerx.blah.com"). In some cases, the DNS server may identify a customer sending the request based on other information, such as the originating IP address or MAC address.

At 325, the DNS server 306 selects a node assigned to customer X to process the received network traffic. In some cases, this determination may be performed by another component within the system, such as a load balancer configured to distribute traffic among different nodes assigned to customer X. The system may also select the node based on its proximity the current location of the customer X device that sent the request, such as by geo-locating the device based on the originating address for the request.

At 330, the DNS server 306 returns the address of the selected node (308) to customer X. At 335, customer X 302 sends encrypted network traffic to node 308, which is assigned to customer X. At 340, the node 308 decrypts and processes the customer X network traffic.

At 345, customer Y 304 sends a DNS query including a domain name. In some cases, the domain name may be a "virtual" domain name, meaning that domain name does not refer to a specific server, but instead to any node or server hosting a node that can serve as an entry point into the customer's particular node container. For example, a virtual domain name sent by customer Y might include a subdomain identifying the customer (e.g., "customery.blah-.com"). In some cases, the DNS server may identify a customer sending the request based on other information, such as the originating IP address or MAC address.

At 350, the DNS server 306 selects a node assigned to customer Y to process the received network traffic, as described above. At 355, the DNS server 306 returns the address of the selected node (310) to customer Y. At 360, customer Y 304 sends encrypted network traffic to node 310, which is assigned to customer Y. At 365, the node 310 decrypts and processes the customer Y network traffic.

In some implementations, the cloud computing system may not include the DNS server 306, and the customers may be configured to send network traffic directly to a node to which they are assigned, such as by utilizing encrypted tunnels to the assigned nodes. In either case, the network traffic is only decrypted by a node that is dedicated to that particular customer, and thus is kept isolated from network traffic and data from other customers.

Figure 4:
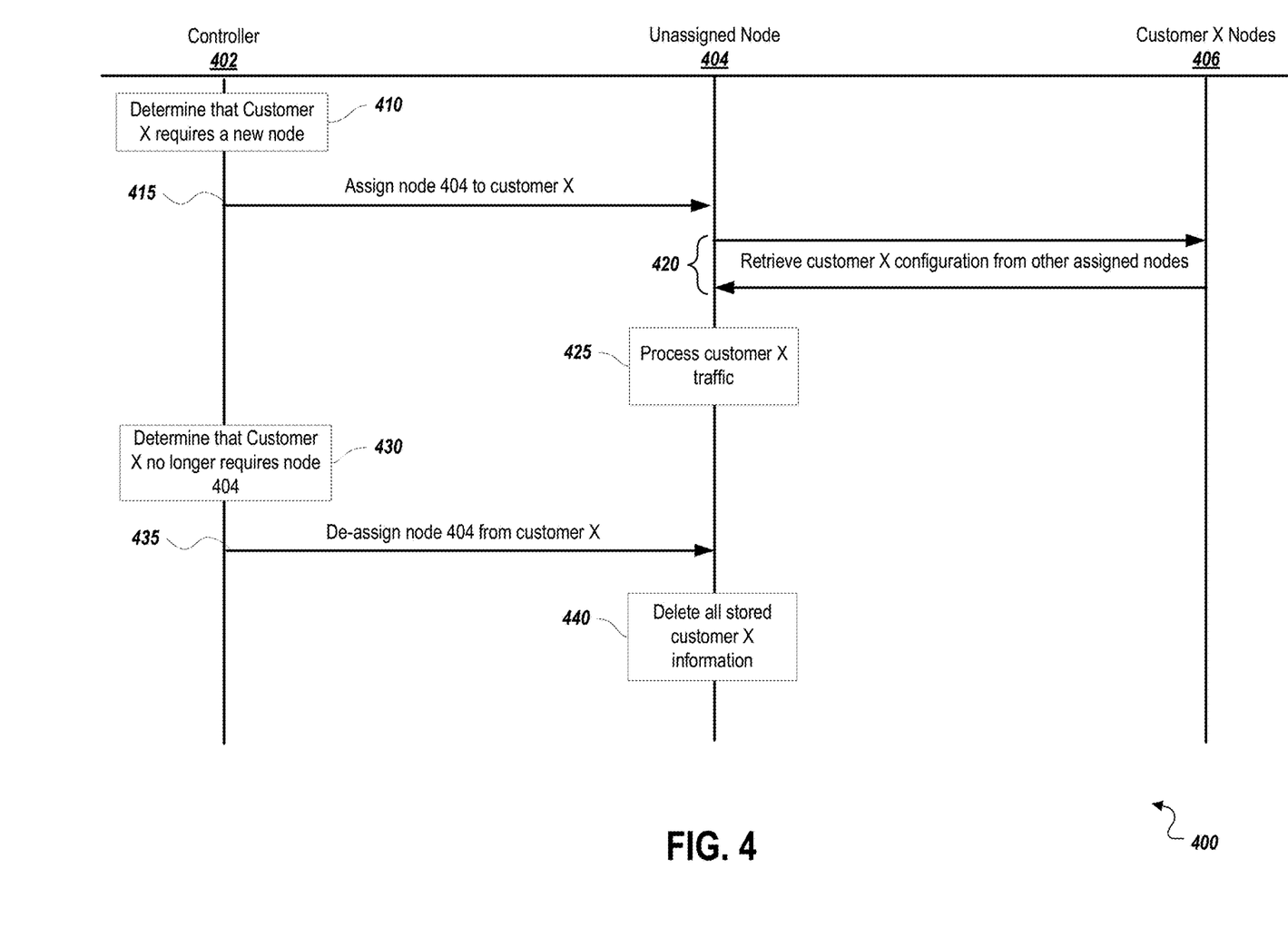
FIG. 4 is a swim lane diagram showing a process for assigning and de-assigning a node from a particular customer in a distributed network security system.

FIG. 4 is a swim lane diagram showing a process for assigning and de-assigning a node from a particular customer in a distributed network security system. At 410, a controller 402 determines that customer X requires a new node, such as in response to increased network traffic, increase utilization on existing assigned nodes, or other events. At 415, the controller 402 signs and unassigned node 404 to customer X. In response, at 420, the node 404 retrieves configuration data for customer X from other nodes assigned to customer X. In some cases, the node 404 may receive the configuration data from other nodes of the same type (e.g., other web security nodes if the node 404 is a web security node). This process results in the configuration data for customer X only being stored at nodes assigned to customer X, thereby ensuring the data isolation previously discussed.

At 425, the node 404 processes network traffic received from customer X, as described previously relative to FIG. 1. At 430, the controller 402 determines that customer X no longer requires node 404, such as in response to decreased network traffic, decreased utilization across nodes assigned to customer X, or other events. At 435, controller 402 de-assigns node 404 from customer X, such as by sending a command to the node 404 over a network. In response, at 440, the node 404 deletes any local data it has stored associated with customer X, and returns to the set of unassigned nodes as a "blank" node.

Figure 5:
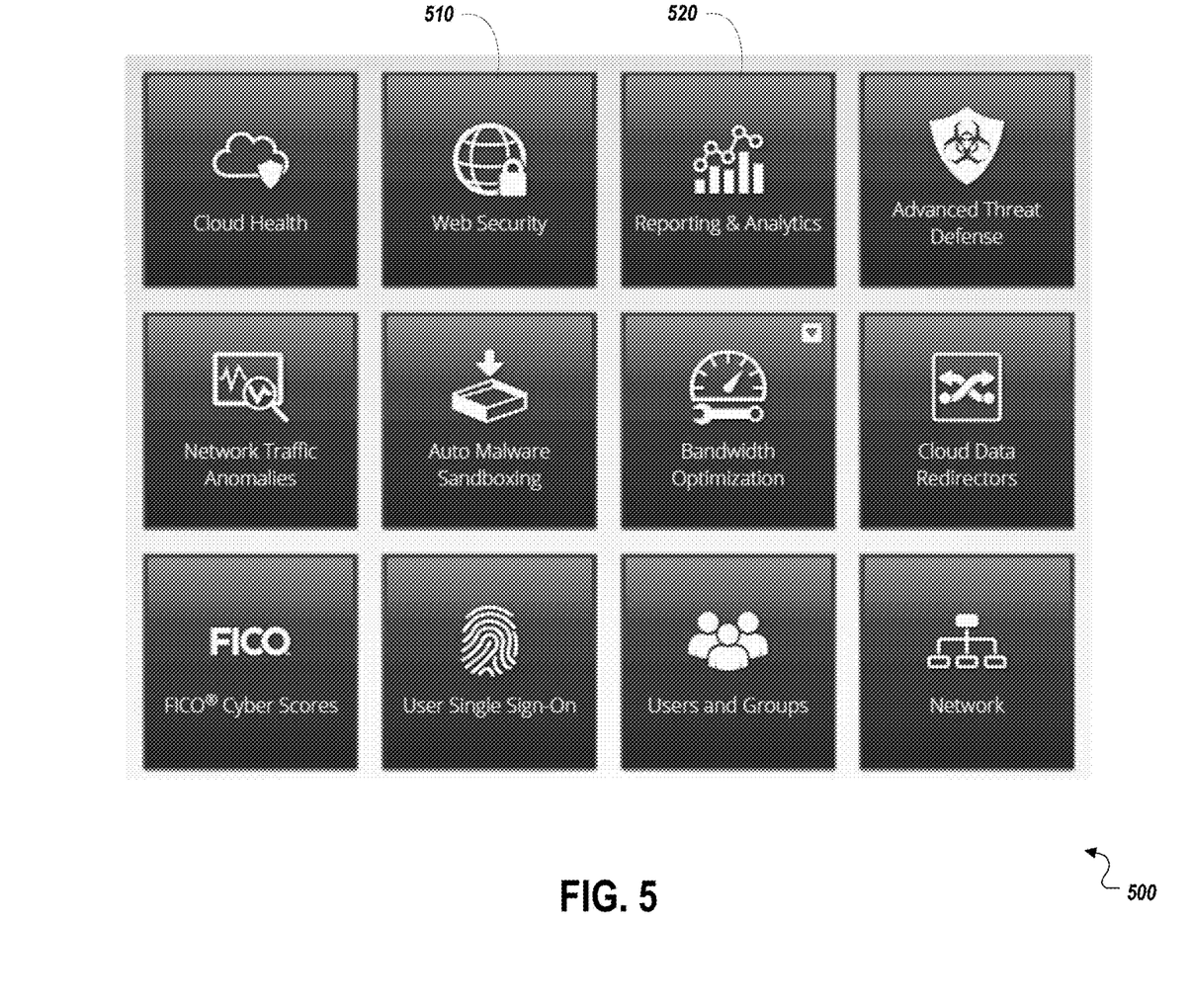
FIG. 5 is an example user interface for the distributed network security system.

FIG. 5 is an example user interface 500 for the distributed network security system. The user interface 500 may be presented to a user, such as through a web browser, and may receive input from the user, for example in the form of keystrokes or mouse clicks. The user interface 500 includes an array of visual tiles (e.g., 510, 520) each associated with the particular function of the cloud computing system. Before accessing user interface 500, the user may have provided login credentials to a multi-tenant authentication system, and a system that presents the user interface 500 may itself be multi-tenant. When the user activates one of the visual tiles, a request to a node associated with the particular function denoted by the tile is generated. This request is sent to a single-tenant node assigned to the customer with which the user is associated. The single-tenant node may respond with a subsequent user interface (e.g., a webpage to be rendered in the user's browser) allowing the user to access or change data associated with the particular customer. For example, when a user associated with a customer A clicks on the web security tile 510, a request may be sent to a web security node assigned to customer A (e.g., web security node 152 in FIG. 1). The web security node may respond to the user with a webpage including configuration or other data associated with customer A. If a user from another customer clicks on the web security tile 510, a request would be generated to a different web security node associated with that customer. In this way, a global, multi-tenant user interface may be implemented to service multiple customers of the cloud computing system, while requests involving customer data are still handled by single-tenant nodes dedicated to that particular customer.

Figure 6:
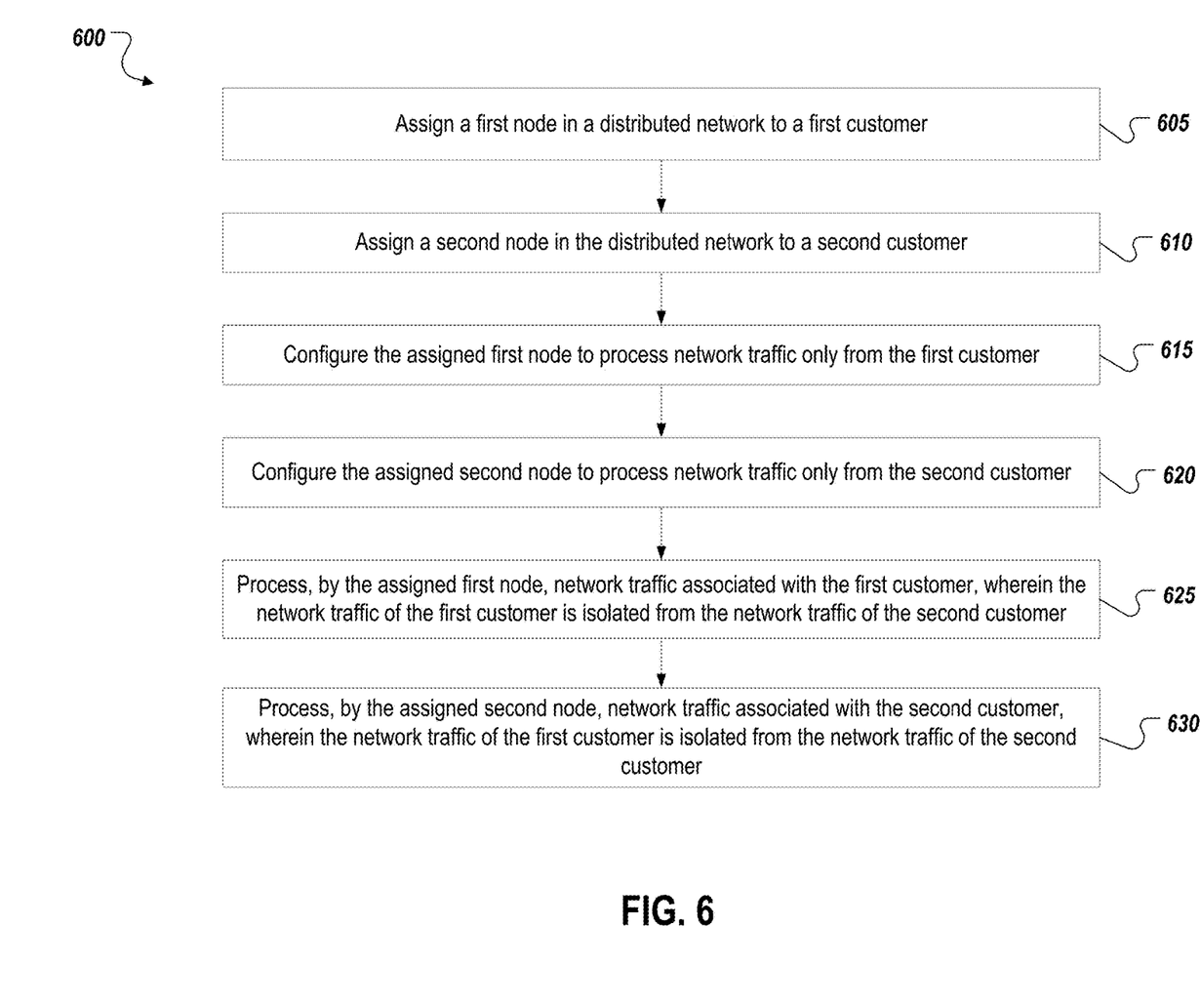
FIG. 6 is a flow chart showing a process for delivering a distributed network security service providing isolation of customer data.

FIG. 6 is a flow chart showing a process 600 for delivering a distributed network security service providing isolation of customer data. The process 600 may be performed in the context any of the systems previously described. At 605, a first node in a distributed network is assigned to a first customer. In some cases, the first node is selected from a set of unassigned nodes that are not assigned to any customer. The first node may be assigned to the first customer based on a determination that the first customer requires additional processing resources. In some implementation, the first node is a virtual machine instance executed by a physical computing device. The first node may also be a physical computing device located on a local network controlled by the first customer. The first node may be an administrative node, a web security node, a reporting node, a sandbox node, an uptime node, a risk assessment node, or any other type of node. In some cases, the first node is a web security node, and processing the network traffic associated with the first customer includes applying a network policy to the network traffic. In some implementations, the first node is a reporting node, and processing the network traffic associated with the first customer includes storing data associated with the network traffic of the first customer.

At 610, a second node in the distributed network is assigned to a second customer, the second node being different than the first node and the second customer being different than the first customer. The second node may be selected from the set of unassigned nodes, and may include all functionality described relative to the first node.

At 615, the assigned first node is configured to process network traffic only from the first customer. In some cases, configuring the assigned first node includes receiving, by the assigned first node, configuration information specific to the first customer only from one or more other nodes assigned to the first customer. At 620, the assigned second node is configured to process network traffic only from the second customer. At 625, the assigned first node processes network traffic associated with the first customer, wherein the network traffic of the first customer is isolated from the network traffic of the second customer. At 630, the assigned second node processes network traffic associated with the second customer, wherein the network traffic of the first customer is isolated from the network traffic of the second customer.

In some cases, the process 600 further includes determining that the first customer no longer requires the first node after assigning the first node to the first customer, and de-assigning the first node from the first customer including deleting data associated with the first customer from the first node, and returning the first node to set of unassigned nodes. The process 600 may include assigning an additional node to the first customer, wherein the additional node is a virtual machine executed by a physical computing device located on a different network than the first node. The additional node assigned to the first customer may be of the same or a different node type than the first node.

In some implementations, the process 600 includes determining that the first customer requires additional processing resources in a particular geographic location based on at least one request associated with the first customer received from the particular geographic location, wherein assigning the first node to the first customer includes selecting the first node from the set of unassigned nodes based on a proximity of the location of a physical computing device associated with the first node to the particular geographic location.

In some cases, the process 600 includes receiving, from a client associated with the first customer, a request to access a multi-tenant user interface; authenticating the client to the multi-tenant user interface using credentials associated with the first customer; receiving a request to access data associated with the first customer from the client via the multi-tenant user interface; and in response to receiving the request from the client via the multi-tenant user interface, generating a request to the first node assigned to the first customer.

Figure 7:
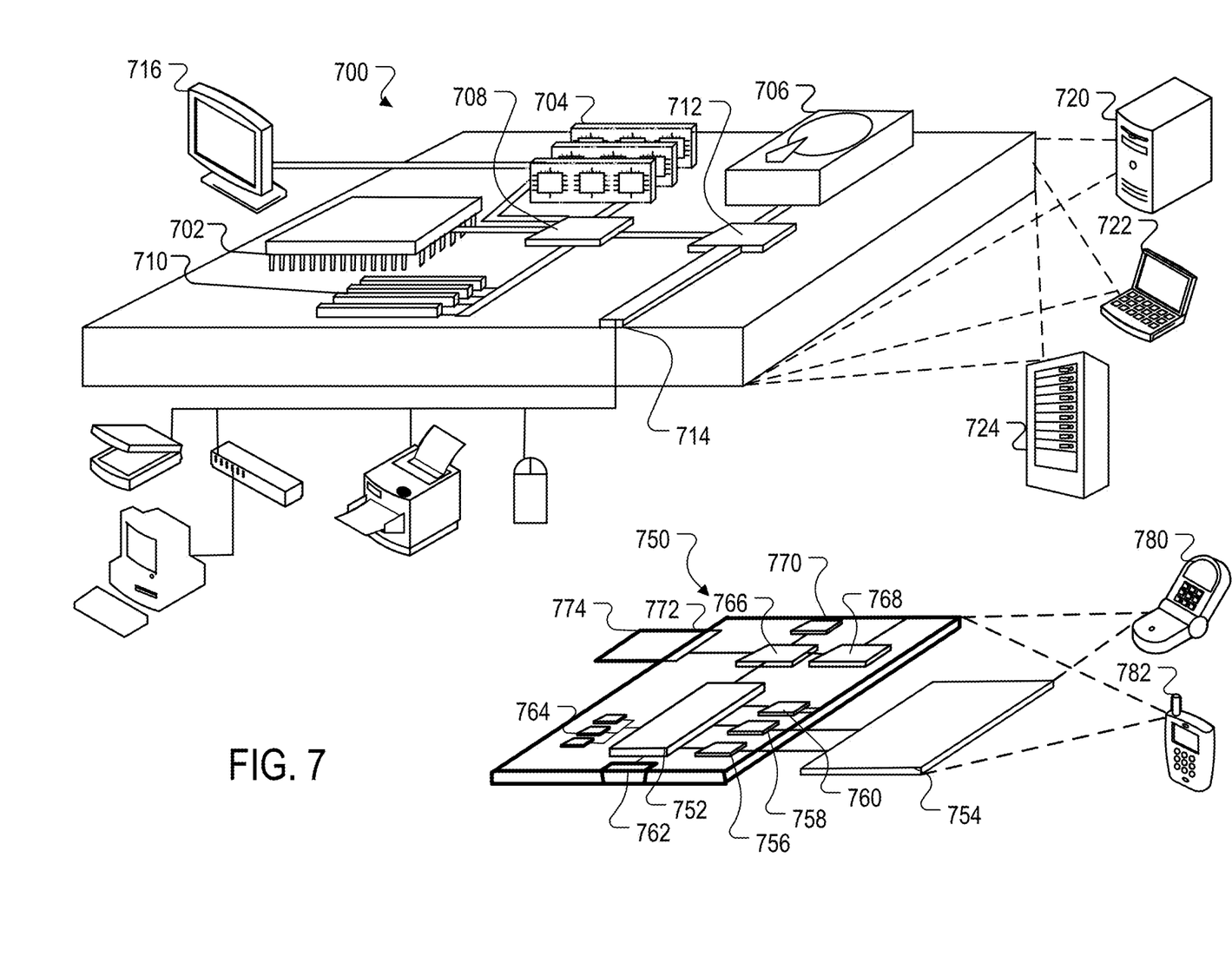
FIG. 7 is a block diagram of computing devices that may be used to implement the systems and methods described herein.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors comprising:
    maintaining a distributed network security service, the security service configured to perform operations comprising:
        generating, for each of a plurality of client networks, an associated node container;
        executing, in each node container, one or more nodes that are each configured to act as an intermediary between clients of the associated client network and sources outside the distributed network, and to examine i) traffic addressed to the associated client network and originating from sources outside the distributed network; and ii) traffic addressed to the sources outside the distributed network and originating from the associated client network;
        wherein traffic associated with one client network is inaccessible to node containers associated with other client networks;
        wherein some of the nodes executing in a plurality of the node containers are copies of the same virtual machine;
        wherein a first node of a first client network is an instance of a particular virtual machine, and is executing on local hardware that is part of the first client network; and
        wherein a second node of a second client network also is an instance of the particular virtual machine, and is executing on remote hardware that is not a part of the first client network or the second client network.

2. The method of claim 1, wherein a third node of the first client network is an instance of the same particular virtual machine and is executing on remote hardware that is not a part of the first client network or the second client network.

3. The method of claim 2, wherein the particular virtual machine is configured to access a security policy of a node container's associated client network and to apply the security policy to the i) traffic addressed to the associated client network and originating from sources outside the distributed network; and ii) traffic addressed to the sources.

4. The method of claim 3, wherein, to access a security policy of a node container's associated client network, the virtual machine is configured to request the security policy from another node executing in the same node container.

5. The method of claim 2, wherein a fourth node of the first client network is a physical machine with functionality different than the virtual machine.

6. The method of claim 5, wherein the fourth node is housed on the remote hardware.

7. The method of claim 5, wherein the fourth node is housed on the first client network.

8. A non-transitory, computer-readable medium storing instructions operable when executed to cause at least one processor to perform operations comprising:
    maintaining a distributed network security service, the security service configured to perform operations comprising:
        generating, for each of a plurality of client networks, an associated node container;
        executing, in each node container, one or more nodes that are each configured to act as an intermediary between clients of the associated client network and sources outside the distributed network, and to examine i) traffic addressed to the associated client network and originating from sources outside the distributed network; and ii) traffic addressed to the sources outside the distributed network and originating from the associated client network;
        wherein traffic associated with one client network is inaccessible to node containers associated with other client networks;
        wherein some of the nodes executing in a plurality of the node containers are copies of the same virtual machine;
        wherein a first node of a first client network is an instance of a particular virtual machine, and is executing on local hardware that is part of the first client network; and
        wherein a second node of a second client network also is an instance of the particular virtual machine, and is executing on remote hardware that is not a part of the first client network or the second client network.

9. The non-transitory, computer-readable medium of claim 8, wherein a third node of the first client network is an instance of the same particular virtual machine and is executing on remote hardware that is not a part of the first client network or the second client network.

10. The non-transitory, computer-readable medium of claim 9, wherein the particular virtual machine is configured to access a security policy of a node container's associated client network and to apply the security policy to the i) traffic addressed to the associated client network and originating from sources outside the distributed network; and ii) traffic addressed to the sources.

11. The non-transitory, computer-readable medium of claim 10, wherein, to access a security policy of a node container's associated client network, the virtual machine is configured to request the security policy from another node executing in the same node container.

12. The non-transitory, computer-readable medium of claim 9, wherein a fourth node of the first client network is a physical machine with functionality different than the virtual machine.

13. The non-transitory, computer-readable medium of claim 12, wherein the fourth node is housed on the remote hardware.

14. The non-transitory, computer-readable medium of claim 12, wherein the fourth node is housed on the first client network.

15. A system comprising:
one or more processors; and
computer memory storing instructions operable when executed by the processors to cause the processors to perform operations comprising:
maintaining a distributed network security service, the security service configured to perform operations comprising:
generating, for each of a plurality of client networks, an associated node container;
executing, in each node container, one or more nodes that are each configured to act as an intermediary between clients of the associated client network and sources outside the distributed network, and to examine i) traffic addressed to the associated client network and originating from sources outside the distributed network; and ii) traffic addressed to the sources outside the distributed network and originating from the associated client network;
wherein traffic associated with one client network is inaccessible to node containers associated with other client networks;
wherein some of the nodes executing in a plurality of the node containers are copies of the same virtual machine;
wherein a first node of a first client network is an instance of a particular virtual machine and is executing on local hardware that is part of the first client network; and
wherein a second node of a second client network also is an instance of the particular virtual machine and is executing on remote hardware that is not a part of the first client network or the second client network.

16. The system of claim 15, wherein a third node of the first client network is an instance of the same particular virtual machine and is executing on remote hardware that is not a part of the first client network or the second client network.

17. The system of claim 16, wherein the particular virtual machine is configured to access a security policy of a node container's associated client network and to apply the security policy to the i) traffic addressed to the associated client network and originating from sources outside the distributed network; and ii) traffic addressed to the sources.

18. The system of claim 17, wherein, to access a security policy of a node container's associated client network, the virtual machine is configured to request the security policy from another node executing in the same node container.

19. The system of claim 16, wherein a fourth node of the first client network is a physical machine with functionality different than the virtual machine.

20. The system of claim 19, wherein the fourth node is housed on the remote hardware.

* * * * *